United States Patent
Qing et al.

(10) Patent No.: US 12,324,373 B1
(45) Date of Patent: Jun. 10, 2025

(54) COMBINE HARVESTER FOR SEED PRODUCTION AND MULTIPLICATION OF GRAINS WITH AUTOMATIC CLEANING FUNCTION

(71) Applicant: Hainan University, Hainan (CN)

(72) Inventors: Yiren Qing, Hainan (CN); Lu Chen, Hainan (CN); Ranbing Yang, Hainan (CN); Xiantao Zha, Hainan (CN); Songmei Yang, Hainan (CN); Jian Zhang, Hainan (CN)

(73) Assignee: Hainan University, Haikou (CN)

( * ) Notice: Subject to any disclaimer, the term of this patent is extended or adjusted under 35 U.S.C. 154(b) by 0 days.

(21) Appl. No.: 18/942,301

(22) Filed: Nov. 8, 2024

(30) Foreign Application Priority Data

Apr. 25, 2024 (CN) .......................... 202410503096.7

(51) Int. Cl.
*A01D 41/127* (2006.01)
*A01D 41/06* (2006.01)
*A01D 41/12* (2006.01)
*A01D 57/20* (2006.01)

(52) U.S. Cl.
CPC ......... *A01D 41/1276* (2013.01); *A01D 41/06* (2013.01); *A01D 41/1252* (2013.01); *A01D 57/20* (2013.01)

(58) Field of Classification Search
CPC ........ A01D 41/00–41/16; A01D 45/30; A01D 57/02
See application file for complete search history.

(56) References Cited

U.S. PATENT DOCUMENTS

| | | | | |
|---|---|---|---|---|
| 5,322,472 A * | 6/1994 | Little | ................. | A01D 41/1252 460/119 |
| 6,036,600 A * | 3/2000 | Kruckman | ......... | A01D 41/1252 460/117 |
| 9,295,197 B1 * | 3/2016 | Veikle | .................... | A01F 12/46 |
| 11,771,008 B1 * | 10/2023 | Hawley | .................. | A01F 12/46 460/16 |
| 2022/0256771 A1 * | 8/2022 | Beutel | .................. | A01M 29/34 |
| 2024/0023487 A1 * | 1/2024 | Hawley | ............. | A01D 41/1252 |

FOREIGN PATENT DOCUMENTS

| CN | 111492792 A | 8/2020 |
|---|---|---|
| CN | 213034827 U | 4/2021 |
| CN | 114793605 A | 7/2022 |
| CN | 117859523 A | 4/2024 |

* cited by examiner

*Primary Examiner* — Christopher J Sebesta
*Assistant Examiner* — Madeline I Runco

(57) ABSTRACT

A combine harvester for seed production and multiplication of grains with automatic cleaning function includes a machine body. The machine body includes a header for harvesting grain plants, and a cleaning device mounted on the header for cleaning the header. The cleaning device includes a controller connected to both a blowing mechanism and a material collecting box mechanism via signals. The blowing mechanism is employed to allow for automatic cleaning of the header without the need to shut down the machine; and seeds and other residues blown out during the cleaning can be recovered through the material collecting box mechanism, avoiding waste.

2 Claims, 5 Drawing Sheets

COMBINE HARVESTER FOR SEED PRODUCTION AND MULTIPLICATION OF GRAINS WITH AUTOMATIC CLEANING FUNCTION

CROSS-REFERENCE TO RELATED APPLICATION

This application claims priority of Chinese Patent Application No. 202410503096.7, filed on Apr. 25, 2024, the entire contents of which are incorporated herein by reference.

TECHNICAL FIELD

The present disclosure relates to the technical field of header cleaning of harvesters, and specifically relates to a combine harvester for seed production and multiplication of grains with automatic cleaning function.

BACKGROUND

For existing combine harvesters, the cleaning of headers is mainly conducted by shutting down the machine, using hydraulic control levers to open the header or other parts prone to accumulation of residues, relying on the natural gravity of grains, or using a blower gun carried on the machine, which requires a driver to conduct after getting off the machine.

This method has problems such as long cleaning time, poor cleaning effect, unclear cleaning results, and low level of intelligence, so it is unsuitable for continuous harvesting operations. In addition, the seeds blown off from the header will directly fall into the field and be difficult to collect, causing seed wastage.

SUMMARY

In response to the problems of low automation level and seed wastage during the cleaning in the existing combine harvesters for seed production and multiplication of grains, the present disclosure provides a combine harvester for seed production and multiplication of grains with automatic cleaning function, including a machine body. The machine body includes a header for harvesting grain plants, and a cleaning device mounted on the header for cleaning the header.

The cleaning device includes:
a blowing mechanism for blowing out residues from the header,
a material collecting box mechanism for receiving the residues blown out by the blowing mechanism, and
a controller connected to both the blowing mechanism and the material collecting box mechanism via signals.

In response to a cleaning instruction, the controller controls an air outlet of the blowing mechanism to extend above the header and controls the material collecting box mechanism to open for receiving the residues.

Preferably, the blowing mechanism includes:
an air nozzle for serving as the air outlet,
a centrifugal blower for serving as an air source of the air nozzle,
an air pipe for connecting the centrifugal blower to the air nozzle, and
a motor connected to the controller via signals, capable of driving the air nozzle to extend above the header in response to the cleaning instruction.

Preferably, the header is arranged with a hidden blower cover plate, and
the hidden blower cover plate is connected to the controller via signals, capable of being opened and driving the air nozzle to extend above the header in response to the cleaning instruction.

Preferably, the material collecting box mechanism includes:
a box body for receiving the residues blown out,
a cover plate of material collecting box capable of being opened in a case of cleaning the header,
a sliding plate for being pulled out to recover the residues collected in the box body, and
an electric push rod of material collecting box, with a fixed end secured to an inner wall of the box body and a push rod end connected to the cover plate of material collecting box.

The electric push rod of material collecting box is connected to the controller via signals, capable of opening the cover plate of material collecting box and allowing the box body to receive the residues blown out in response to the cleaning instruction.

Preferably, a shooting assembly is further arranged inside the box body, for recording images of the box body receiving the residues in real-time during the cleaning.

Preferably, the machine body further includes:
a reel and reel teeth mounted thereon, the reel being used for rotating and pushing grain plants onto the header through the reel teeth,
a cutter for cutting off the roots of the grain plants pushed onto the header, and
a conveying auger for moving the grain plants cut by the cutter away from the header and towards a threshing component.

Preferably, multiple air-blowing ports are disposed on an outer wall of one side, facing the header, of the reel teeth, and
the air-blowing ports are used for blowing seeds of the grain plants that have been collided outside the header by the conveying auger back onto the header, and these seeds blown back are recovered by the material collecting box mechanism as the residues.

The present disclosure also provides an automatic cleaning method for a combine harvester for seed production and multiplication of grains, including the following steps:
blowing air through the air outlet of the blowing mechanism in response to the cleaning instruction;
extending the air outlet of the blowing mechanism above the header, and opening the material collecting box mechanism at the same time;
blowing residues on the header by the air outlet into the material collecting box mechanism;
recovering the residues received by the material collecting box mechanism to complete the automatic cleaning; and
recording images in real-time and transmitting the same to a tablet in a cab by the shooting assembly, allowing a driver to monitor in real-time.

Compared with the prior art, the present disclosure has the following significant beneficial effects.

(1) In the present disclosure, the blowing mechanism is employed to allow for automatic cleaning of the header without the need to shut down the machine; and seeds and other residues blown out during the cleaning can be recovered through the material collecting box mechanism, avoiding waste.

(2) Both the blowing mechanism and the material collecting box mechanism in the present disclosure are designed in a hidden setup, which are extended or opened only in the cleaning process. In other cases, they remain retracted or closed, avoiding interference with other operations of the machine body.

(3) Multiple air-blowing ports, or pores, on the reel teeth of the present disclosure can generate an air curtain through blowing, blowing seeds that have fallen outside the header back, and these seeds are recovered during the subsequent cleaning, reducing header losses.

(4) In the present disclosure, the high-speed camera arranged inside the box body can record the cleaning process in real-time and transmit the cleaning effect to the tablet in the cab, assisting operators in judging the progress of the cleaning operation without stopping the machine and recording the cleaning results for various plots.

DETAILED DESCRIPTION

Example 1

Figure 1:
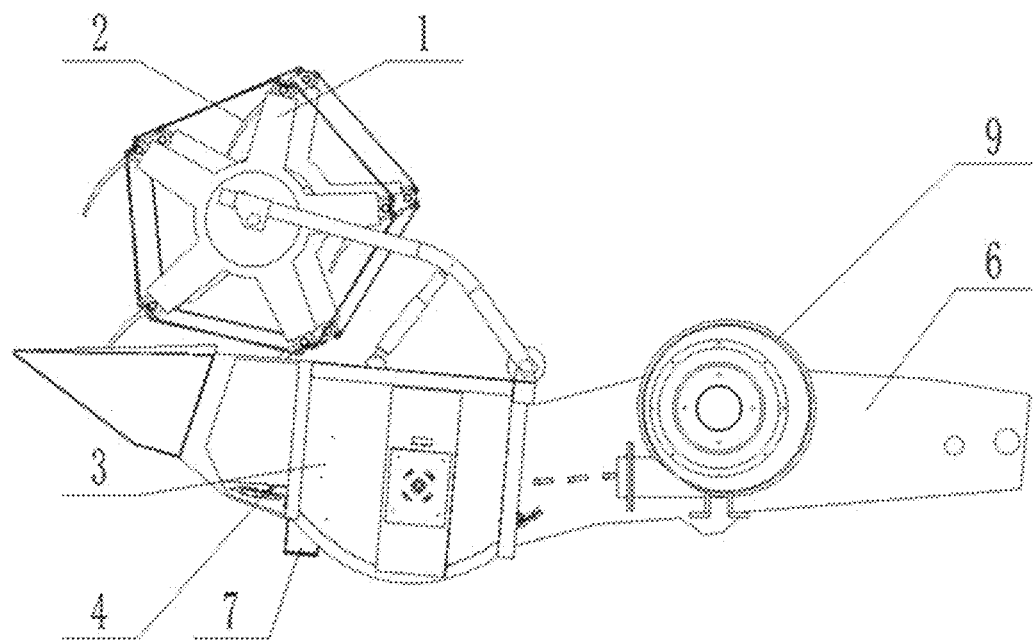
FIG. 1 is a schematic structural diagram of a machine body according to the present disclosure.
Figure 2:
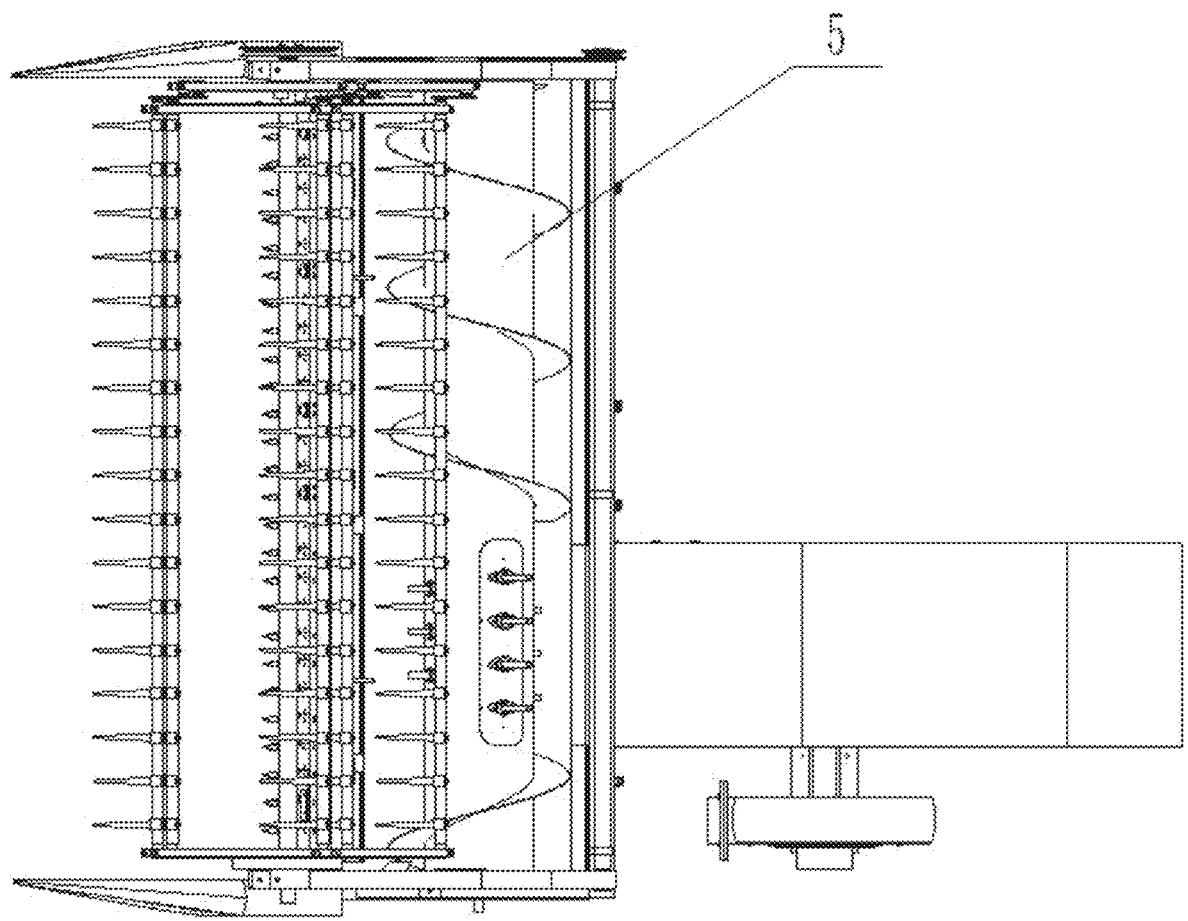
FIG. 2 is a schematic structural diagram of FIG. 1 from another perspective.
Figure 3:
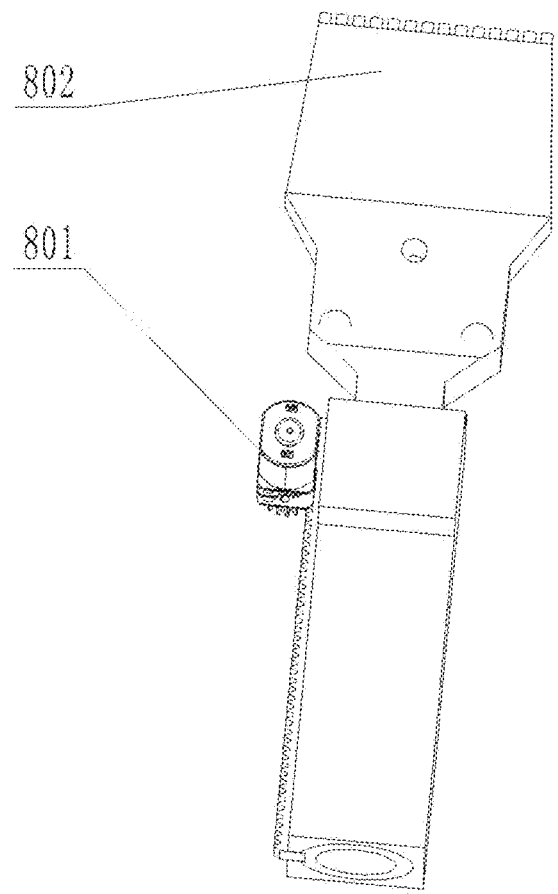
FIG. 3 is a schematic structural diagram of an air pipe, a motor and an air nozzle according to the present disclosure.
Figure 4:
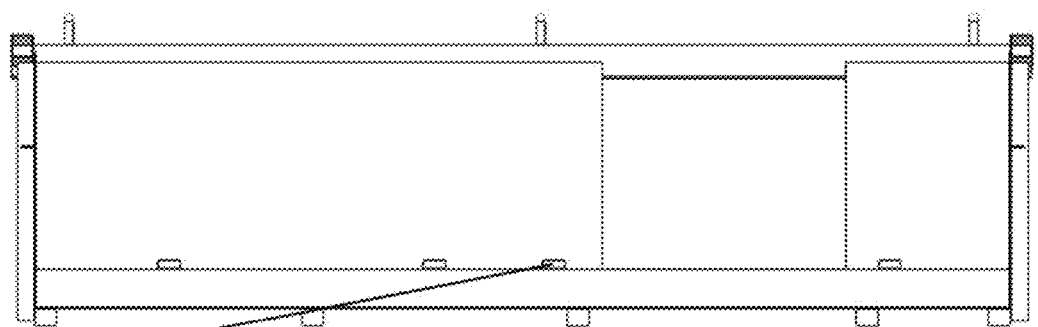
FIG. 4 is a schematic structural diagram of a hidden blower cover plate and related structures thereof according to the present disclosure.
Figure 5:
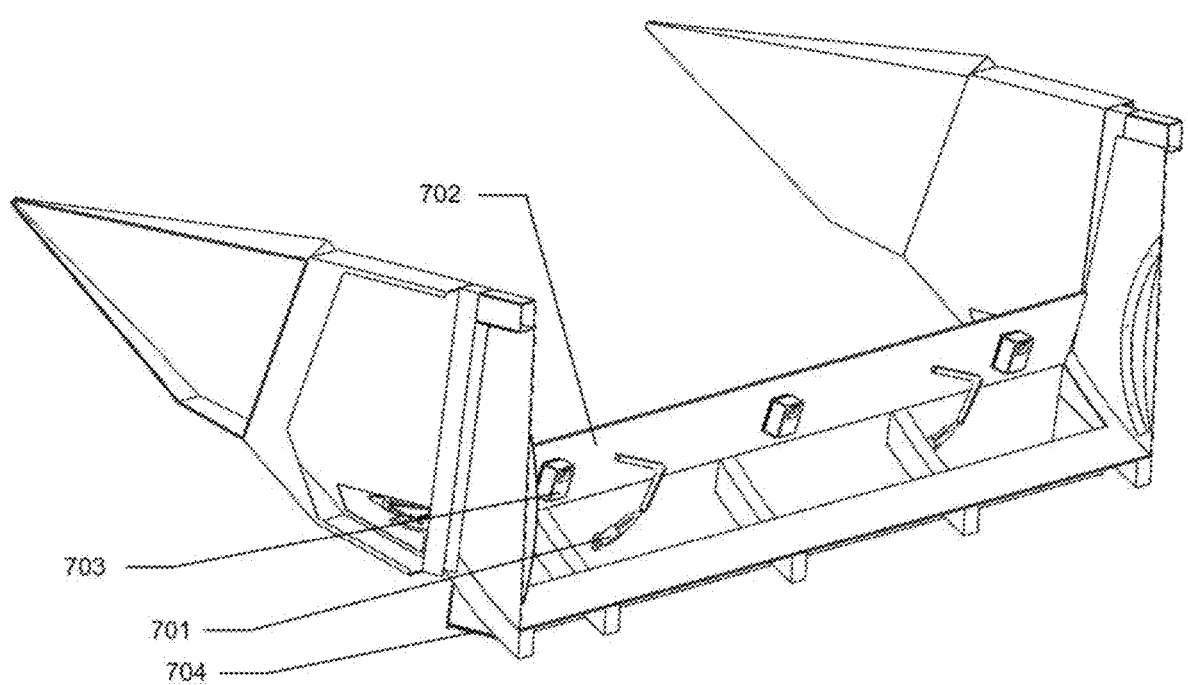
FIG. 5 is a schematic structural diagram of a material collecting box mechanism according to the present disclosure.
Figure 6:
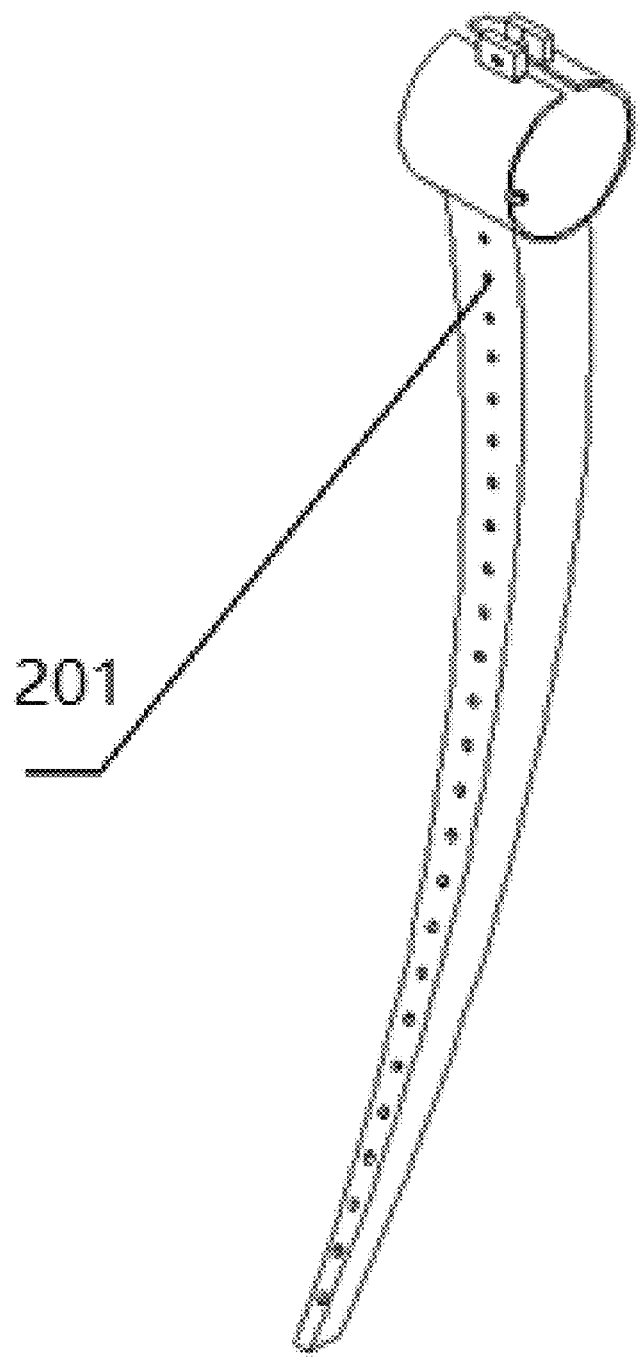
FIG. 6 is a schematic structural diagram of reel teeth and air-blowing ports according to the present disclosure.

Referring to FIGS. 1-6, this example provides a combine harvester for seed production and multiplication of grains with automatic cleaning function, including a machine body. The machine body includes a header 3 for harvesting grain plants, a reel 1, reel teeth 2 arranged on the reel 1, a cutter 4 and a conveying auger 5.

Specifically, in the harvesting process, the reel 1 is rotated and the grain plants are pushed onto the header 3 through the reel teeth 2. The cutter 4 is employed to cut off the roots of the grain plants that have been pushed onto the header 3. Subsequently, the conveying auger 5 moves the grain plants cut by the cutter 4 away from the header 3, and towards a threshing component via a connecting bridge 6, thereby completing the harvesting of the grain plants.

However, the conveying auger 5 collides with the heads of the grain plants, making some seeds fall off. In response to this problem, multiple air-blowing ports 201 are disposed on an outer wall of one side of the reel teeth 2 facing the header 3 in this example. The air-blowing ports 201 can generate an air curtain through blowing, to blow the seeds that have fallen outside the header 3 back.

Further, in this example, the machine body further includes a cleaning device mounted on the header 3 and used for cleaning the header 3.

The cleaning device includes an air-blowing mechanism, a material collecting box mechanism, and a controller.

In response to a cleaning instruction, the controller controls an air outlet of the blowing mechanism to extend above the header 3 and controls the material collecting box mechanism to open. The cleaning instruction is triggered through the "one-click cleaning" function on a display in the cab. Subsequently, the air is blown out through the air outlet to blow the residues on the header 3 towards the direction of the material collection box mechanism. The opened material collection box mechanism is capable of receiving the residues blown out by the blowing mechanism. The residues include leftover seeds and stalks with heads.

Example 2

This example is the same as Example 1, but with the following differences. The blowing mechanism includes: an air nozzle 802 serving as the air outlet, a centrifugal blower 9 serving as an air source of the air nozzle 802, an air pipe for connecting the centrifugal blower 9 to the air nozzle 802, and a motor 801 connected to the controller via signals.

The motor 801 is capable of driving the air nozzle 802 to extend above the header 3 in response to the cleaning instruction.

Specifically, in this example, the extension of the air nozzle 802 is stably controlled through the motor 801.

In addition, the header 3 is arranged with a hidden blower cover plate 10, which is connected to the controller via signals, capable of opening and driving the air nozzle 802 to extend above the header 3 in response to the cleaning instruction.

It will be appreciated that the hidden blower cover plate 10 can keep the air nozzle 802 hidden in cases except for the clearing operation, to protect the air nozzle 802.

In this example, the material collecting box mechanism includes: a box body 7 for receiving the residues blown out, a material collecting box cover plate 702 capable of being opened in a case of cleaning the header 3, a sliding plate 704 for being pulled out to recover the residues collected in the box body 7, and a material collecting box electric push rod 701 for controlling the opening and closing of the material collecting box cover plate 702.

The material collecting box cover plate 702 can ensure that the box body 7 remains hidden in normal state. Firstly, the material collecting box cover plate 702 serves as a base plate of a harvester header, ensuring smooth transportation of the harvested crop. Secondly, it avoids mixing impurities in the box body 7 during the cleaning, thus avoiding mixing of different varieties of recovered seeds. Finally, it protects various components in the box body 7.

A fixed end of the material collecting box electric push rod 701 is secured to an inner wall of the box body 7, and a push rod end is connected to the material collecting box cover plate 702.

The material collecting box electric push rod 701 is connected to the controller via signals, and capable of opening the material collecting box cover plate 702 and allowing the box body 7 to receive the residues blown out in response to the cleaning instruction.

In this example, a shooting assembly is further arranged inside the box body 7, for recording images of the box body 7 receiving the residues in real-time during the cleaning. The shooting assembly is a high-speed camera 703.

The high-speed camera 703 can record the cleaning process in real time and transmits the clearing results to the tablet in the cab. This helps the operator to judge the progress of the cleaning operation without stopping the machine and to record the cleaning results of various plots.

Example 3

The present disclosure provides an automatic cleaning method for a combine harvester for seed production and multiplication of grains, which is applied to Example 2, including the following steps.

In response to the cleaning instruction, air is blown through the air outlet of the blowing mechanism. The air outlet of the blowing mechanism is extended above the header, and the material collecting box mechanism is opened at the same time. Residues on the header are blown by the air outlet into the material collecting box mechanism. The residues received by the material collecting box mechanism are recovered to complete the automatic cleaning. The blowing mechanism is reset, and the material collecting box mechanism is closed.

It is readily understandable that, on the basis of one or more examples provided in the present application, those skilled in the art can combine, split and reorganize the examples of the present disclosure to obtain other examples, and those examples are within the scope of protection of the present application.

The above is an illustrative description of the present disclosure and examples thereof. This description is not limited, and what shown in the examples are merely partial implementations of the present disclosure. The actual structure is not limited to this. Therefore, for those ordinary skilled in the field inspired by the above examples, without departing from the creative purpose of the present disclosure, they can design structures and examples similar to the technical solutions of the present disclosure without creative efforts, and those structures and examples are included in the scope of protection of the present disclosure.

The invention claimed is:

1. A combine harvester for seed production and multiplication of grains with automatic cleaning function, comprising a machine body, wherein the machine body comprises a header for harvesting grain plants, and a cleaning device mounted on the header for cleaning the header;
   the cleaning device comprising:
   a blowing mechanism for blowing out residues from the header,
   a material collecting box mechanism for receiving the residues blown out by the blowing mechanism, and
   a controller connected to both the blowing mechanism and the material collecting box mechanism via signals,
   in response to a cleaning instruction, the controller controlling an air outlet of the blowing mechanism to extend above the header and controlling the material collecting box mechanism to open for receiving the residues;
   the blowing mechanism comprising:
   an air nozzle for serving as the air outlet,
   a centrifugal blower for serving as an air source of the air nozzle,
   an air pipe for connecting the centrifugal blower to the air nozzle, and
   a motor connected to the controller via signals, capable of driving the air nozzle to extend above the header in response to the cleaning instruction;
   the header being arranged with a hidden blower cover plate,
   the hidden blower cover plate being connected to the controller via signals, capable of being opened and driving the air nozzle to extend above the header in response to the cleaning instruction;
   the material collecting box mechanism comprising:
   a box body for receiving the residues blown out,
   a cover plate of material collecting box capable of being opened in a case of cleaning the header,
   a sliding plate for being pulled out to recover the residues collected in the box body,
   an electric push rod of material collecting box, with a fixed end secured to an inner wall of the box body and a push rod end connected to the cover plate of material collecting box,
   the electric push rod of material collecting box being connected to the controller via signals, and capable of opening the cover plate of material collecting box and allowing the box body to receive the residues blown out in response to the cleaning instruction, and
   a shooting assembly being further arranged inside the box body, for recording images of the box body receiving the residues in real-time during the cleaning; and
   the machine body further comprises:
   a reel and reel teeth mounted thereon, the reel being used for rotating and pushing grain plants onto the header through the reel teeth,
   a cutter for cutting off the roots of the grain plants pushed onto the header, and
   a conveying auger for moving the grain plants cut by the cutter away from the header and towards a threshing component,
   multiple air-blowing ports being disposed on an outer wall of one side, facing the header, of the reel teeth, and
   the air-blowing ports being used for blowing seeds of the grain plants that have been collided outside the header by the conveying auger back onto the header, and these seeds blown back being recovered by the material collecting box mechanism as the residues.

2. An automatic cleaning method for a combine harvester for seed production and multiplication of grains, implemented using the combine harvester for seed production and multiplication of grains with automatic cleaning function according to claim 1, comprising the following steps:
   blowing air through the air outlet of the blowing mechanism in response to the cleaning instruction;
   extending the air outlet of the blowing mechanism above the header, and opening the material collecting box mechanism at the same time;
   blowing the residues on the header by the air outlet into the material collecting box mechanism;
   recovering the residues received by the material collecting box mechanism to complete the automatic cleaning; and
   resetting the blowing mechanism, and closing the material collecting box mechanism.

\* \* \* \* \*